(12) United States Patent
Bo et al.

(10) Patent No.: US 8,339,537 B2
(45) Date of Patent: Dec. 25, 2012

(54) DISPLAY

(75) Inventors: Qi-Lin Bo, Shenzhen (CN); Hong-Qi Hou, Shenzhen (CN); Ming-Chang Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 282 days.

(21) Appl. No.: 12/823,321

(22) Filed: Jun. 25, 2010

(65) Prior Publication Data
US 2011/0242445 A1 Oct. 6, 2011

(30) Foreign Application Priority Data

Mar. 30, 2010 (CN) .......................... 2010 1 0136065

(51) Int. Cl.
*G02F 1/1333* (2006.01)

(52) U.S. Cl. ... 349/58; 349/60; 361/679.55; 361/679.56
(58) Field of Classification Search .................. None
See application file for complete search history.

(56) References Cited

U.S. PATENT DOCUMENTS

| | | | | |
|---|---|---|---|---|
| 7,236,357 | B2 * | 6/2007 | Chen | 361/679.55 |
| 7,576,975 | B2 * | 8/2009 | Tai et al. | 361/679.21 |
| 2005/0285991 | A1 * | 12/2005 | Yamazaki | 349/58 |
| 2006/0232915 | A1 * | 10/2006 | Chou et al. | 361/681 |
| 2009/0015998 | A1 * | 1/2009 | Havelka et al. | 361/681 |

FOREIGN PATENT DOCUMENTS

CN 2738274 Y 11/2005

* cited by examiner

*Primary Examiner* — Hemang Sanghavi
(74) *Attorney, Agent, or Firm* — Altis Law Group, Inc.

(57) ABSTRACT

A display includes an outer frame defining an circumferential opening in a center, a protective glass accommodated in the opening, an inner frame mounted to the outer frame below the glass, and a liquid crystal display panel mounted to the inner frame. The inner side of the outer frame bounding the opening defines a latching slot to receive sides of the protective glass. The protective glass protects the liquid crystal display panel from being scraped or scratched.

1 Claim, 3 Drawing Sheets

DISPLAY

BACKGROUND

1. Technical Field

The present disclosure relates to a display.

2. Description of Related Art

Generally speaking, a display of a notebook computer includes protective glass covering a liquid crystal display panel. The glass is mounted by glue to an outer frame accommodating the liquid crystal display panel of the notebook computer with glue. However, in assembly, the glue needs a long time to dry, which is inconvenient and slows the assembly process. Furthermore, to disassemble the protective glass if needed during repairs is not easy.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
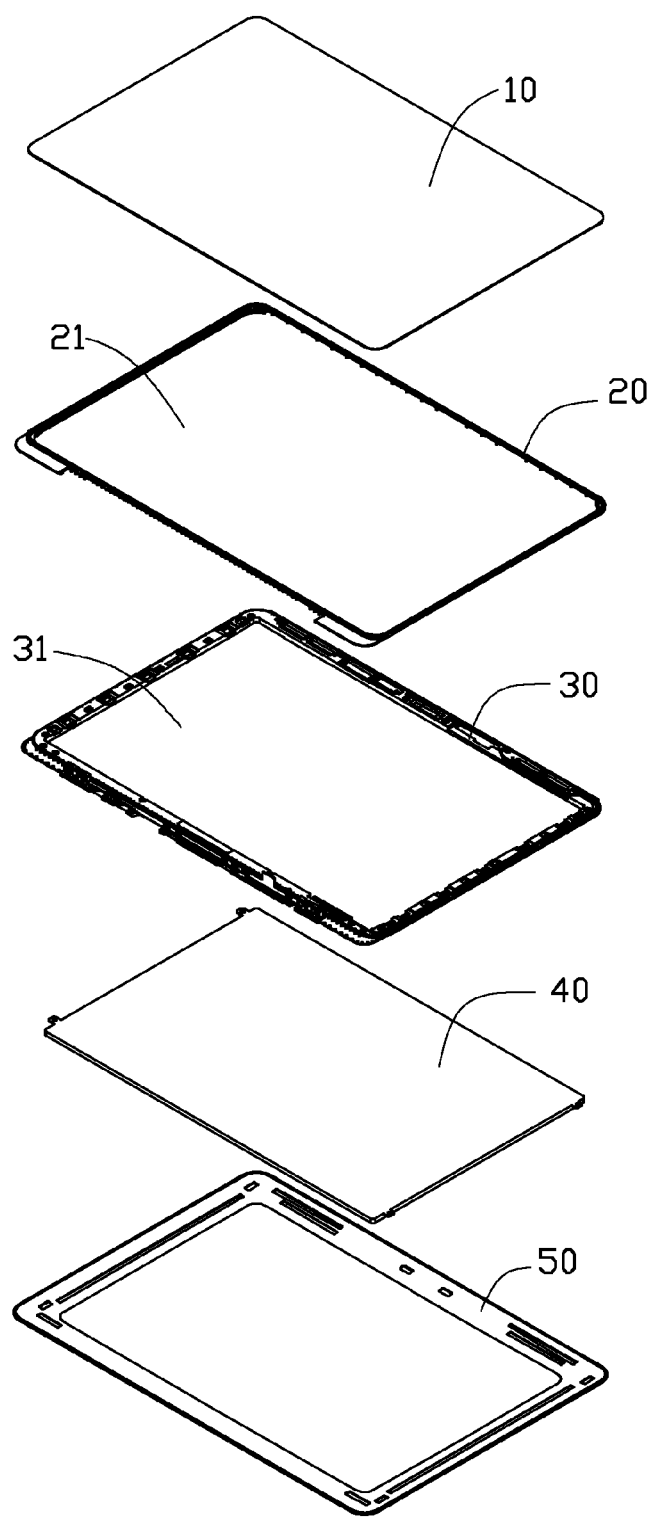
FIG. 1 is an exploded, isometric view of an exemplary embodiment of a display.
Figure 2:
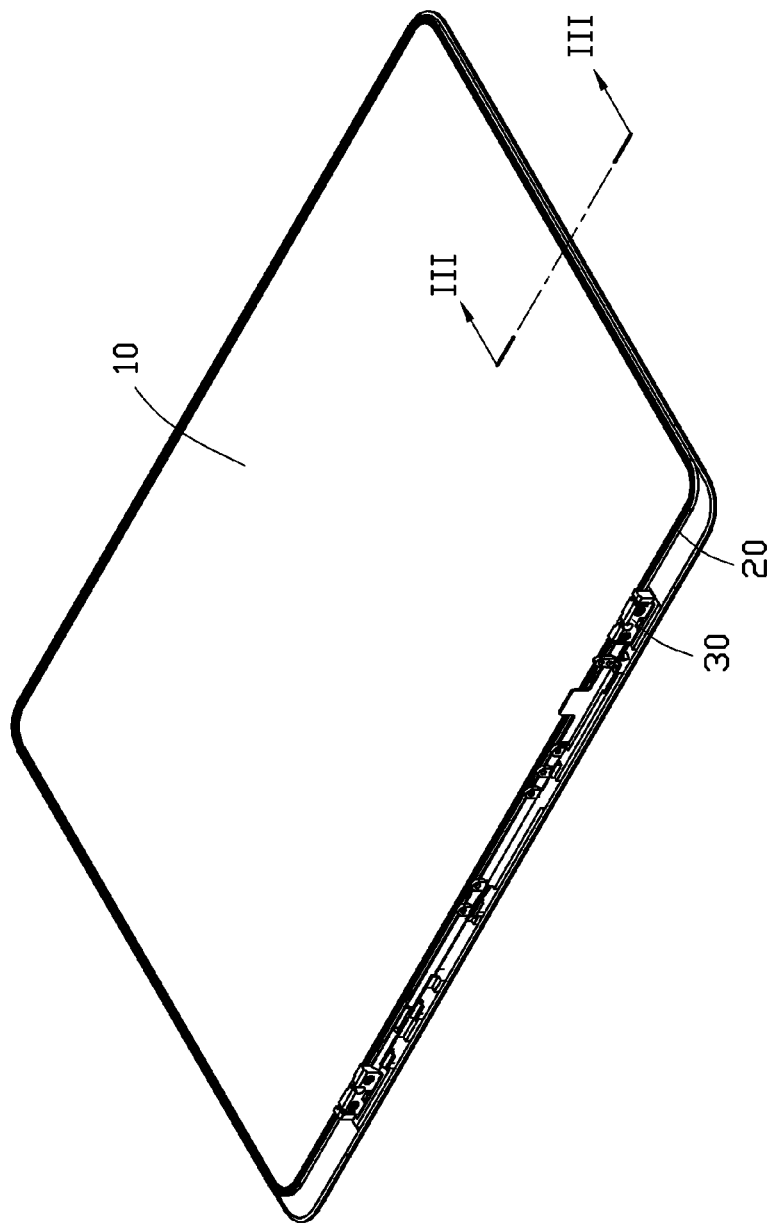
FIG. 2 is an assembled, isometric view of the display of FIG. 1.
Figure 3:
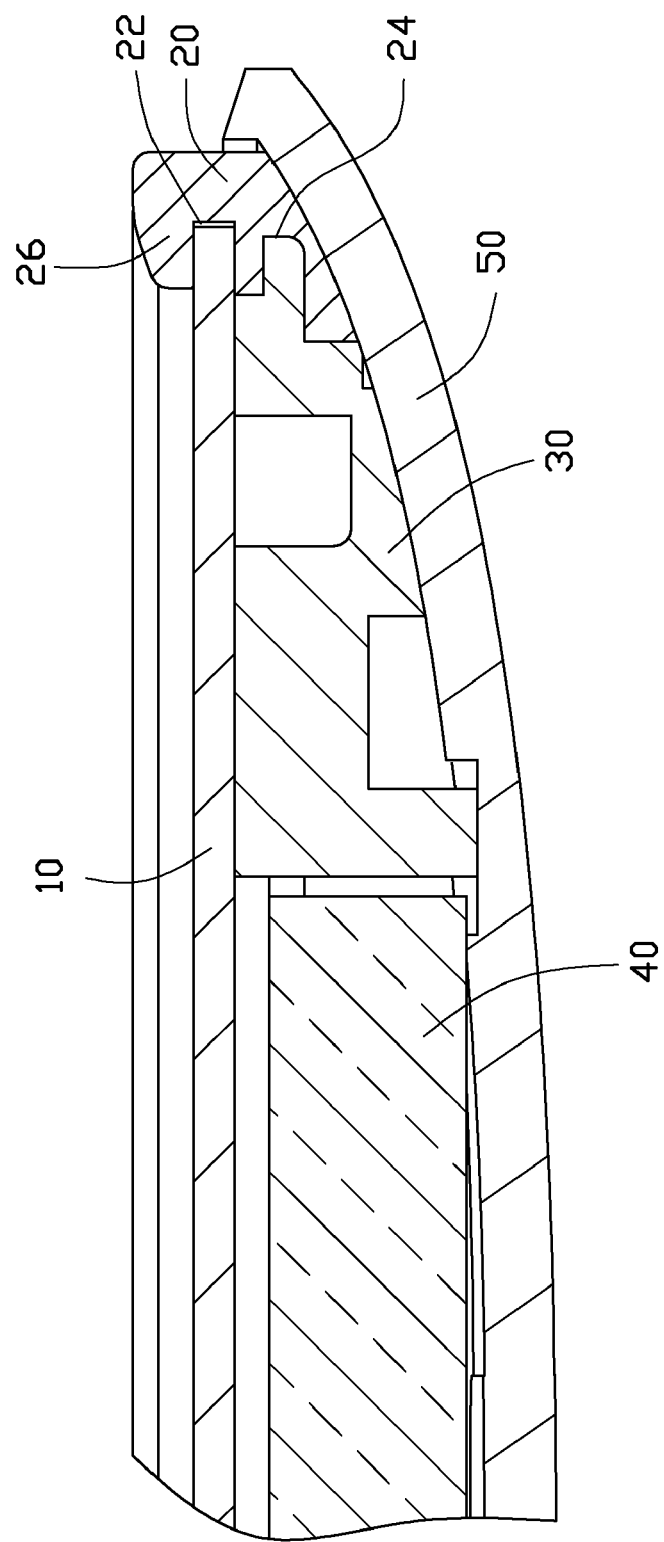
FIG. 3 is a sectional view of the display, taken along the line III-III of FIG. 2.

Referring to FIGS. 1 to 3, an exemplary embodiment of a display includes a piece of protective glass 10, an outer frame 20, an inner frame 30, a liquid crystal display panel 40, and a shell 50. The glass 10 is mounted to the outer frame 20. The outer frame 20 is mounted to the inner frame 30. The outer frame 20 and the inner frame 30 are both mounted to the shell 50. The liquid crystal display panel 40 is mounted among the inner frame 30, the glass 10, and the shell 50. The glass 10 protects the liquid crystal display panel 40 from being scraped or scratched.

The outer frame 20 is rectangular and can be made of thermoplastic polyurethanes (TPU) material. The TPU material has good elasticity and flexibility. The outer frame 20 centrally defines a rectangular opening 21. A circumferential first latching slot 22 and a circumferential second latching slot 24 are defined in inner sides bounding the opening 21, communicating with the opening 21. The first latching slot 22 is parallel to the second latching slot 24, to receive corresponding sides of the glass 10, thereby the glass 10 is mounted to the outer frame 20.

The inner frame 30 is rectangular and centrally defines a rectangular opening 31. Sides of the inner frame 30 are accommodated in the second latching slot 24 of the outer frame 20. An outer side surface of the outer frame 20 adjacent to the first latching slot 22 forms an operating portion 26. The operating portion 26 is slanted from an outer edge to an inner edge bounding the opening 31 of the inner frame 30.

In use, because of the nature of the TPU material and the shape of the operating portion 26, it is very convenient to deform the operating portion 26 to mount the glass 10 in the first latching slot 22 or disassemble the glass 10 from the first latching slot 22.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A display comprising:
    an outer frame made of thermoplastic polyurethanes material and defining a first opening in a center, wherein inner sides of the outer frame bounding the first opening defining a circumferential first latching slot communicating with the first opening;
    a protective glass accommodated in the first opening, with sides of the protective glass engaged in the first latching slot of the outer frame;
    a liquid crystal display panel; and
    an inner frame defining a second opening in a center to accommodate the liquid crystal display panel, wherein the inner frame with the liquid crystal display panel is accommodated in the first opening of the outer frame, with the protective glass covering the liquid crystal display panel;
    wherein the inner sides of the outer frame define a second latching slot to receive the sides of the inner frame; and
    wherein an outer side surface of the outer frame adjacent to the first latching slot forms an operating portion to be operated to deform the outer frame, the operating portion is slanted from outer sides towards the inner sides bounding the first opening of the outer frame.

* * * * *